Jan. 13, 1931.  T. BRADLEY ET AL  1,788,941
DEVICE FOR INDICATING UNDUE WEAR IN BEARINGS
Filed June 23, 1927
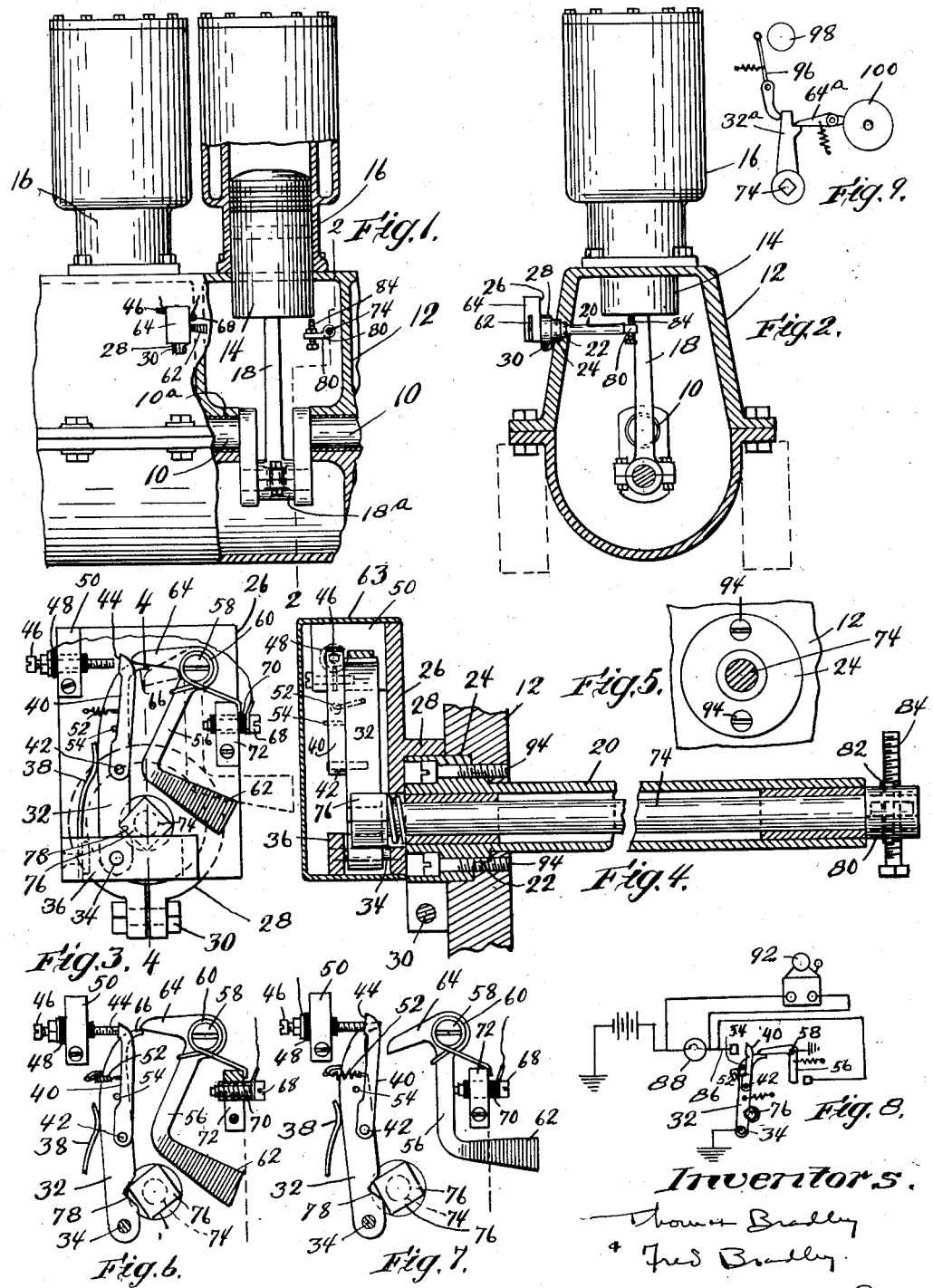

Patented Jan. 13, 1931

1,788,941

UNITED STATES PATENT OFFICE

THOMAS BRADLEY AND FRED BRADLEY, OF NEW BEDFORD, MASSACHUSETTS, ASSIGNORS OF ONE-HALF TO CHESTER F. HATHAWAY, OF NEW BEDFORD, MASSACHUSETTS, AND ELI G. BRALEY, OF FAIRHAVEN, MASSACHUSETTS

DEVICE FOR INDICATING UNDUE WEAR IN BEARINGS

Application filed June 23, 1927. Serial No. 200,874.

This invention relates to devices for detecting undue wear or failure of the bearings of rotating machinery and particularly the connecting rod bearing of internal combustion engines for marine propulsion although the invention can be used in connection with any type of reciprocating engine.

Many ships are driven by two cycle engines which may be of the semi-Diesel or full Diesel type. Since an explosion occurs at every stroke of the engine, and the pressure upon the connecting rod and upon the shaft is thus always in the same direction undue wear of the bearings cannot ordinarily be detected when the engine is running since with this type of engine there is no noise which ordinarily indicates wear in a four cycle engine. Consequently, a bearing may wear rapidly while the engine is running due to failure of oil or for other reasons and ultimately permit the connecting rod to ride directly upon the crank pin and thus score the crank pin. When this occurs, extensive and expensive repairs are necessary.

It is an object of this invention to provide means to detect unusual wear of the bearings of rotating machinery before serious damage has been done and especially the connecting rod bearing of an internal combustion engine.

A further object of the invention is the provision of means operated by the abnormal movements of the piston of an internal combustion engine occuring when there is undue wear of the connecting rod bearing to indicate such wear.

A further object is generally to improve the construction and operation of devices for indicating undue wear or failure of bearings of rotating machinery.

Fig. 1 is a side view partly in section illustrating one cylinder of a marine internal combustion engine with the invention associated therewith.

Fig. 2 is a sectional elevation along line 2—2 of Fig. 1.

Fig. 3 is a front elevation of the alarm device embodying the invention and illustrating particularly the arrangement of the alarm-circuit controlling devices.

Fig. 4 is a section along line 4—4 of Fig. 3.

Fig. 5 is an end view of the supporting housing for the alarm device and illustrating particularly the disposition of the attaching screws therein.

Fig. 6 is a view of the circuit controlling devices one of which is in control of its circuit and is holding the other device out of effective position.

Fig. 7 is a view similar to Fig. 6 but showing both devices in operated and circuit closed position.

Fig. 8 is a diagram illustrating the circuit connections to give both an intermittent and a continuous alarm.

Fig. 9 is a modified construction of the device arranged to operate a mechanical bell-alarm.

The invention as here shown is applied to a marine internal combustion engine of the semi-Diesel type, which is a two-stroke single-acting engine, although it may be applied to any suitable type of engine.

The engine here shown comprises a crank shaft 10 rotating in bearings 10a of the crank case 12. The piston 14 is reciprocable within the cylinder 16 and is connected to the crank shaft through the connecting rod 18. The alarm device embodying this invention is especially adapted to indicate unusual wear in the connecting rod bearing 18a by being operated by abnormal movements of the piston.

The alarm device includes a tubular housing 20 having an enlarged shoulder 22 and a further enlarged cylindrical head 24 at one end. A vertical supporting plate 26 is provided with an annular recess in the rear face thereof in which said enlarged head 24 is received and the wall 28 of said recess is adapted to be clamped about said enlarged head by the bolt 30 whereby to secure the parts in the aforesaid relation. The supporting plate is provided with a plurality of alarm-circuit controlling devices. One of said devices comprises a vertically disposed vibratory arm 32 which is pivoted at its lower end on a pin 34 removably secured to said plate 26 and also to a yoke 36 which is integral with and overlies the lower end of said arm 32. A leaf spring 38 is fixed to said yoke at its lower end and bears against the intermediate portion of said arm 32 whereby to bias it for rotation in a clockwise direction, Fig. 3. A circuit-controlling lever 40 is pivoted at 42 to the intermediate portion of said arm 32 and has a contact face 44 at its upper end which is adapted to engage a fixed contact member or screw 46, which screw is carried adjustably in an insulating bushing 48 received in an outstanding ear 50 of the supporting plate. Said contact arm 40 is urged in a counter-clockwise direction by a spring 52 which is connected at one end to said cam arm 32 and at its other end with said arm 40. A pin 54 serves to limit the movement of said arm 40 in a counterclockwise direction. It is evident that when said arm 32 is moved sufficiently in a counterclockwise direction the arm 40 will be brought into contact with the fixed contact member 46 thereby to close an alarm circuit including said contact members.

A second alarm-circuit controlling and signal member 56 is provided. Said member is pivoted at its upper end upon a screw 58 carried on said supporting plate and has a spring 60 which biases it for constant rotation in a counter-clockwise direction, Fig. 3. The lower end of said arm is provided with an outstanding ear or semaphore 62 which, when permitted to operate, is adapted to project beyond said supporting plate 26 and the enclosing cover 63 for the mechanism and into an exposed position, thus to give a visual indication of undue wear or failure of the bearing and also to indicate with which cylinder the failed bearing is associated. For this purpose said ear 62 may be painted some distinctive color as red. The operation of the alarm member 56 is controlled by the vibratory arm 32. For this purpose said member 56 is provided with a laterally extending projection or ear 64 which overlies the cam extension 66 of the arm 32, and the arrangement is such that when the movement of the cam arm 32 in a counterclockwise direction is sufficiently great said arm will move from under the ear 64 and thus permit free movement of the alarm member 56 into an operated position as shown in Fig. 7.

Said alarm member is also arranged to control a separate circuit and to this end is adapted to make contact, when operated, with a fixed contact member or screw 68 carried by an insulating bushing 70 which is adjustably received in an outstanding ear 72 of the supporting plate. The vibratory arm 32 is controlled by a shaft 74 extended coaxially within the tubular housing 20 and having a squared outer end 76 which is loosely received within a cam notch 78 of the arm 32, which notch is V-shaped or has two cam faces arranged at right angles with each other either one of which is adapted to be engaged by the squared head 76 of the shaft, thus to reciprocate the cam arm 32 upon reciprocatory angular movement of said shaft in either direction. The arm 32 and the spring 38 bearing thereon serve to hold the shaft 74 yieldingly in normal or unoperated position by reason of the seating of the square end 76 of the shaft in the notch 78 of said arm. The inner end of said shaft 74 is provided with a laterally extended arm 80 which is fixed detachably to the shaft by a taper pin 82. Said arm is disposed beneath and mainly at one side of the piston 14 as indicated in Figs. 1 and 2 and is provided with an upwardly-extended striking member 84 which has a screw-threaded connection with said arm by which it can be adjusted into close proximity, although out of actual contact with the bottom edge of the piston when it is at the bottom of its stroke, with the bearings in good condition. It is apparent that under ordinary conditions of the bearings the piston will reciprocate within its cylinder without striking the striking member. When, however, the connecting rod bearing 18a or, for that matter, one of the crank shaft bearings 10a begins to wear, the piston will assume a lower position within its cylinder, and, if wear continues, will ultimately descend sufficiently to strike against the striking member 84 at each reciprocatory movement and thus reciprocate the shaft 74 and also the arm 32 by reason of the cam connection between the two. When the wear becomes sufficiently large, so that the reciprocatory movement of the shaft is sufficiently great, the contact lever 40 carried by said arm 32 will be reciprocated throughout a sufficiently great extent of movement to bring it periodically into and out of contact with the fixed contact member 46 thus periodically closing the alarm circuit 86, Fig. 8, which preferably has both an electric light 88 and an electric bell 92 as warning devices, which devices may be disposed in the pilot house of the boat thus to indicate bearing troubles by the flashing of the lamp and intermittent ringing of the bell. If the wear of the bearing increases so that the reciprocatory movement of the arm 32 increases a point is arrived at where the signal member 56 is tripped and moved to the operated position illustrated in Fig. 7, the alarm circuit is maintained continuously closed so that the light burns and the bell operates continuously until the circuit is disabled or the engine is stopped and the member reset.

One of these devices is adapted to be applied to each cylinder of a multi-cylinder engine, with the lamp 88 and the bell alarm 92 common to all of the devices. The device is adapted to be applied as an attachment to existing engines by appropriately drilling and countersinking the wall of the crank case of the engine to receive the shoulder 22 and head 24 of the housing of the attachment and securing the device in place by the screws 94. The arm 80 is adapted to be attached to the end of the shaft 74 in either one of two oppositely directed positions so that the attachment can be installed on either side of the cylinder of the engine. This dual position of the arm 80 is permitted without the necessity for any change in the mechanism by reason of the cooperating square outer end 76 of the shaft 74 and the V-shaped notch 78 in which said end 76 operates. When the arm 80 is in one position, the upper face of the notch is engaged by the shaft to reciprocate the arm 32 and when the arm 80 is in its other position, the lower face of the notch comes into play.

While the invention, in Figs. 1 through 8 is arranged to control an electric alarm circuit, the invention may also be arranged to operate a mechanical alarm, as shown in Fig. 9. In this figure, the arm 32a, corresponding to the arm 32 of Fig. 3, is attached directly to the end of the shaft 74 and is arranged to vibrate the hammer 96 of a single stroke bell 98. When the extent of vibratory movement of the arm 32a becomes sufficiently great it can move from holding engagement with a latch member 64a of a spring-actuated mechanical bell 100 thereby to cause the bell to operate continuously until its driving spring runs down.

We claim:

1. The combination of a two-cycle single-acting internal combustion engine and its piston, connecting rod, and crank shaft, of a bearing-condition indicating device having an operating member disposed beneath and in line with the direction of movement but normally free from engagement with said piston in its normal reciprocatory movement, said member being located close to the piston at the bottom of its stroke and arranged to be engaged and operated thereby when the stroke of the piston becomes abnormal due to wear of a bearing.

2. The combination of a two-cycle single-acting internal combustion engine and its piston, connecting rod, crank shaft and the enclosing crank case, and an indicating device operable to indicate abnormal wear of a bearing, said indicating device carried by and mainly externally of said crank case and having an operating member extended within said crank case under and in line with the path of movement of said piston and below and beyond the normal bottom position of said piston, said piston adapted to descend below its normal bottom position due to wear of a bearing and strike against and operate said member.

3. In a device for indicating abnormal wear of the bearing of a reciprocatory element, a reciprocatory member adapted to be engaged and reciprocated by the aforesaid element, two indicating devices controlled by said reciprocatory member, means governed by a predetermined reciprocatory movement of said member to operate one of said indicating devices, and means governed only by a reciprocatory movement of said member in excess of a predetermined value to effect the actuation of the other of said indicating devices.

4. In a device for indicating abnormal wear of the bearing of a reciprocatory element, a reciprocatory member adapted to be engaged and reciprocated by the aforesaid element, and two indicating devices controlled by said reciprocatory member, one of said devices having a control member connected with said reciprocatory member for conjoint reciprocatory movement therewith, and adapted to operate said one device upon a predetermined reciprocatory movement of said reciprocatory member and means governed only by a reciprocatory movement of said reciprocatory member in excess of a predetermined value to effect the actuation of the other of said indicating devices.

5. In a device of the class described, a signal-controlling member biased for movement to an operated position, a reciprocatory signal-controlling member having means normally holding said member in an unoperated position and adapted to have a restricted vibratory movement in the aforesaid relation and arranged to release said member when the vibrating movement becomes excessive, a reciprocatory operating element having an operative connection with said reciprocatory signal-controlling member, and signaling means, adapted to be actuated intermittently by said vibratory movement and continuously when said member is released.

6. In a device of the class described, the combination of a circuit-controlling member biased for movement to an operated position, a reciprocatory circuit-controlling member having a cam-connection with said first member and having means arranged to hold said first member in an unoperated position and mounted to have a limited vibratory movement while maintaining the aforesaid relation and to release said first member for movement to an operated position upon an excessive vibratory movement, a reciprocatory operating member having a cam-connection with said reciprocatory circuit-controlling member, and signaling means adapted to be actuated intermittently by said vibratory movement and coninuously when said member is released.

7. In a device of the class described, a pivoted arm, a stationary contact member cooperating and having a yielding engagement with the free end of said arm whereby to close a signal circuit, an operating shaft for said arm having means to reciprocate it angularly and having a cam-connection with said arm, and a pivoted signal member biased for movement toward an operated position and having a projection engaging the free end of said pivoted arm by which it is normally restrained from operation, said arm having such an extent of movement that it can move away from cooperative relation with said projection whereby to release said signal member for operation.

8. In a bearing wear indicator, a supporting plate having a vibrating arm pivoted thereto, signal mechanism having means by which it is controlled by said arm means for normally retaining said signal mechanism and arm in normal relative position, a housing connected with and extended away from said plate, a shaft adapted for reciprocating angular movement journalled in said housing and having a cam-connection at said plate with said vibrating arm, and an arm carried by and extended laterally of the free end of said shaft having a striker-member provided with an adjustable connection with said shaft.

9. A condition-indicating device for the bearings of engines comprising a tubular housing adapted for insertion in the crank case of an engine and having an enlarged head arranged to be secured to the wall of the crank case, a shaft disposed within said housing adapted for reciprocating angular movement therein, an arm fixed to the inner end of said shaft having an upwardly-directed projection adapted to be engaged and depressed by the piston of the engine in abnormal movements thereof, a vertically-disposed supporting plate having a detachable connection with said housing-head, a vibratory arm pivoted to said plate and having a cam-notch therein, said shaft having a cam-projection engaging said notch whereby to reciprocate said pivoted arm, an alarm-circuit controlling contact member, said pivoted arm having a yielding contact member cooperating with the aforesaid contact member, a pivoted signal arm having means normally biasing it for movement into an operated position and having a projection normally resting upon the free end of said pivoted arm, whereby to be held in unoperated position, said pivoted arm adapted upon excessive vibratory movement to pass from under said projection whereby to release said signal arm for movement, and a second alarm-circuit controlling contact member cooperating with said signal arm.

10. The combination of an engine and its piston, connecting rod, crank shaft and crank case, and a bearing-indicating device carried by said crank case having a shaft extended into the interior of said crank case below and at one side of said piston, said shaft having an arm which is fixed thereto and which extends laterally below and under and close to said piston when it is at the normal bottom of its stroke, said piston adapted to descend into a lower bottom position when wear of a bearing occurs and strike against and reciprocate said arm and shaft, and signal means controlled by said reciprocatory shaft.

11. A device for indicating abnormal wear in the bearings of an engine having a reciprocatory piston comprising a shaft having a laterally-extended arm adapted to be engaged and reciprocated by the piston during abnormal movements thereof, whereby to reciprocate said shaft angularly, a pivoted arm, said shaft having a cam connection with said arm whereby said arm is reciprocated with said shaft, said cam connection having means to hold said shaft releasably in a normal unoperated position, means including a spring maintaining said arm and shaft in engagement, and a signal device having controlling means engaged and operated by said arm.

12. A device for indicating abnormal wear in the bearings of an engine having, in combination with the reciprocatory piston of the engine, a supporting housing, a shaft in said housing having an exposed arm at one end thereof that is located in position to be engaged and reciprocated by said piston in abnormal movements thereof, a pivoted arm having a double cam-connection with said shaft whereby to be reciprocated thereby, a spring bearing against said arm and operable to maintain said arm and also said shaft yieldingly in engagement in a predetermined position, and a signal device having controlling means engaged by said arm.

13. A device for indicating the failure of bearings including a signal device having a stationary member, a movable member cooperating therewith including a pivoted arm, an angularly-reciprocable shaft for actuating said movable member having oppositely-acting cam-connections with said arm which act separately to reciprocate said arm as said shaft is reciprocated angularly in either one of opposite directions from a normal position, and means adapted to be carried by said shaft in either of two positions for angularly reciprocating the said shaft in either one of opposite directions.

14. A device for indicating the failure of bearings including a signal device having a stationary member, a movable member cooperating therewith including a pivoted arm, an angularly-reciprocable shaft for actuating said controller having oppositely-acting cam-connections with said arm which act separately to reciprocate said arm as said shaft is reciprocated angularly in either one of opposite directions from a normal position, said cam connections also including means to hold said shaft releasably in said normal position, and means adapted to be carried by said shaft in either of two positions for angularly reciprocating the said shaft in either one of opposite directions.

15. A device for indicating the failure of bearings including a signal device having a stationary signal-controlling member, a pivoted arm cooperating therewith having a notch therein which has oppositely-inclined cam faces, an angularly-reciprocable shaft for reciprocating said arm having a cam-section which is located in said notch and has oppositely-inclined cam faces each of which normally engages a separate cam face of said notch, spring means acting on said arm and holding said arm and shaft yieldingly in the aforesaid relation, and means adapted to be carried by said shaft in either of two positions for angularly reciprocating the said shaft in either one of opposite directions.

16. A signal device for indicating wear in bearings comprising signaling means including an electrical signal, a stationary member including a stationary contact, a movable member including a movable contact, said stationary and movable members adapted to be intermittently operated to thereby engage said contacts to actuate said signal intermittently to indicate bearing wear, and normally inactive means associated with said movable member and under the control thereof operable upon a predetermined degree of movement of said movable member to actuate the signal to indicate a degree of bearing wear beyond that indicated by the said intermittent engagement of said contacts.

17. A device for indicating the failure of bearings including a signal device having a stationary member, a movable member cooperating therewith including a pivoted arm, and an angularly-reciprocable shaft for actuating said movable member having oppositely-acting cam-connections with said arm which act separately to reciprocate said arm as said shaft is reciprocated angularly in either one of opposite directions from a normal position.

18. A device for indicating the failure of bearings including a signal device having a stationary signal-controlling member, a pivoted arm cooperating therewith having a notch therein which has oppositely-inclined cam faces, an angularly-reciprocable shaft for reciprocating said arm having a cam-section which is located in said notch and has oppositely-inclined cam faces each of which normally engages a separate cam face of said notch, as said shaft is reciprocated angularly in either one of opposite directions from a normal position, and spring means acting on said arm and holding said arm and shaft yieldingly in the aforesaid relation.

19. A bearing wear indicator comprising an elongated housing adapted to be inserted within the frame of a machine, said housing having a flange and means associated therewith for securing said housing to the machine frame, an angularly reciprocable shaft extending through said housing having means at one end thereof adapted to be actuated by a part of the machine when the wear of a bearing exceeds a predetermined amount, a movable member supported near the other end of said shaft and actuated thereby, and signalling means under the control of said movable member.

20. A bearing wear indicator comprising an elongated housing adapted to be inserted within the frame of a machine, said housing having a flange and means associated therewith for securing said housing to the machine frame, an angularly reciprocable shaft extending through said housing having means at one end thereof adapted to be actuated by a part of the machine when the wear of a bearing exceeds a predetermined amount, a pivoted arm having a notch therein which has oppositely inclined cam faces, the other end of said shaft having a cam section which is located in said notch and has oppositely inclined cam faces each of which normally engages a separate cam face of said notch to reciprocate said arm as said shaft is reciprocated angularly in either one of opposite directions from a normal position, and signalling means under the control of said arm.

21. A bearing wear indicator comprising an elongated housing adapted to be inserted within the frame of a machine, said housing having a flange and means associated therewith for securing said housing to the machine frame, an angularly reciprocable shaft extending through said housing having means at one end thereof adapted to be actuated by a part of the machine when the wear of a bearing exceeds a predetermined amount, a pivoted arm having a notch therein which has oppositely inclined cam faces, the other end of said shaft having a cam section which is located in said notch and has oppositely inclined cam faces each of which normally engages a separate cam face of said notch to reciprocate said arm as said shaft is reciprocated angularly in either one of opposite directions from a normal position, and means adapted to be carried by the first mentioned end of said shaft in either of two positions for angularly reciprocating the said shaft in either one of opposite directions.

In testimony whereof, we have signed our names to this specification.

THOMAS BRADLEY.
FRED BRADLEY.